(12) United States Patent
Weissenmayer et al.

(10) Patent No.: US 11,260,850 B2
(45) Date of Patent: Mar. 1, 2022

(54) METHOD FOR INFLUENCING DRIVING DYNAMICS OF A VEHICLE, AND DRIVING DYNAMICS CONTROLLER

(71) Applicant: Robert Bosch GmbH, Stuttgart (DE)

(72) Inventors: Simon Weissenmayer, Flein (DE); Michael Frank Schmidt, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 16/595,571

(22) Filed: Oct. 8, 2019

(65) Prior Publication Data

US 2020/0114903 A1 Apr. 16, 2020

(30) Foreign Application Priority Data

Oct. 10, 2018 (DE) .......................... 102018217325.7

(51) Int. Cl.
*B60W 30/02* (2012.01)
*B60W 10/04* (2006.01)
*B60W 10/18* (2012.01)
*B60W 50/00* (2006.01)

(52) U.S. Cl.
CPC ............ *B60W 30/02* (2013.01); *B60W 10/04* (2013.01); *B60W 10/18* (2013.01); *B60W 50/00* (2013.01); *B60W 2050/0095* (2013.01); *B60W 2552/00* (2020.02); *B60W 2710/18* (2013.01)

(58) Field of Classification Search
CPC ... B62D 15/025; B60W 30/182; B60W 30/02; B60W 2050/0095; B60W 30/18172; B60W 50/082; B60W 2555/20; B60W 2552/35; B60W 2552/40; B60W 40/06; B60W 40/064
See application file for complete search history.

(56) References Cited

U.S. PATENT DOCUMENTS

| | | | |
|---|---|---|---|
| 6,424,904 B1* | 7/2002 | Takahashi | B60K 31/0083 340/441 |
| 2006/0253243 A1 | 11/2006 | Svendenius et al. | |
| 2014/0307247 A1* | 10/2014 | Zhu | G01S 13/867 356/4.01 |
| 2014/0350789 A1* | 11/2014 | Anker | B60W 40/00 701/41 |
| 2015/0191160 A1* | 7/2015 | Fairgrieve | B60K 28/16 701/93 |
| 2016/0161950 A1* | 6/2016 | Frangou | B60W 30/16 701/27 |
| 2017/0129298 A1* | 5/2017 | Lu | B60G 17/015 |

(Continued)

FOREIGN PATENT DOCUMENTS

| | | |
|---|---|---|
| DE | 102012020906 A1 | 4/2014 |
| DE | 102013113431 A1 | 6/2015 |

(Continued)

*Primary Examiner* — Donald J Wallace
(74) *Attorney, Agent, or Firm* — Norton Rose Fulbright US LLP; Gerard Messina

(57) ABSTRACT

A method for influencing driving dynamics of a vehicle, in which the driving dynamics are influenced as a function of parameters allocated to a selected driving dynamics mode when the driving dynamics mode is activated, and the driving dynamics are influenced as a function of road state information representing a road state in the region of the vehicle when an automatic mode is activated.

14 Claims, 1 Drawing Sheet

(56) References Cited

U.S. PATENT DOCUMENTS

| | | | | |
|---|---|---|---|---|
| 2019/0206253 A1* | 7/2019 | Amano | ............ | G08G 1/096791 |
| 2019/0344783 A1* | 11/2019 | Bertollini | .............. | B60W 40/06 |
| 2019/0375407 A1* | 12/2019 | Maleki | ................ | B60W 30/162 |
| 2020/0064833 A1* | 2/2020 | Fox | .................... | G06K 9/00845 |

FOREIGN PATENT DOCUMENTS

| | | | | |
|---|---|---|---|---|
| DE | 102016225352 A1 | | 6/2018 | |
| FR | 2982804 A1 * | | 5/2013 | ............ B60W 40/09 |

* cited by examiner

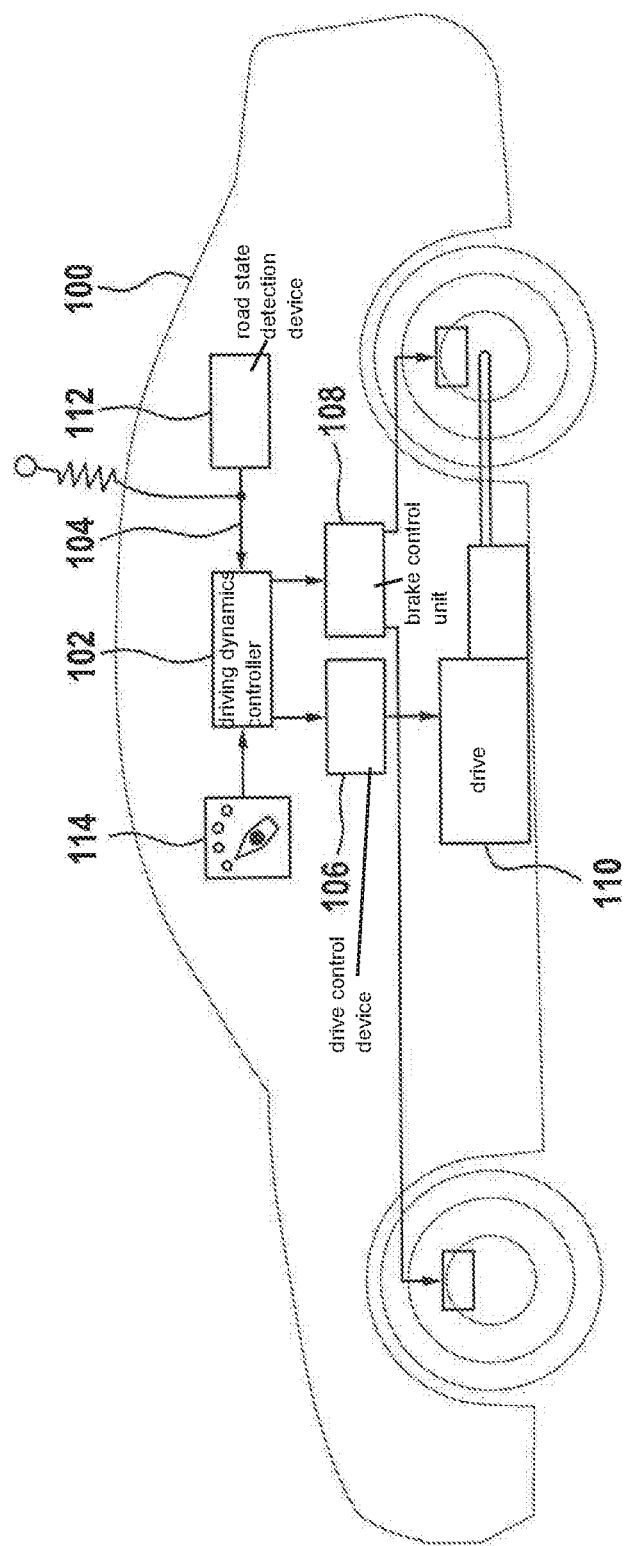

METHOD FOR INFLUENCING DRIVING DYNAMICS OF A VEHICLE, AND DRIVING DYNAMICS CONTROLLER

CROSS REFERENCE

The present application claims the benefit under 35 U.S.C. § 119 of German Patent Application No. DE 102018217325.7 filed on Oct. 10, 2018, which is expressly incorporated herein by reference in its entirety.

FIELD

The present invention relates to a method for influencing driving dynamics of a vehicle, and to a driving dynamics controller.

BACKGROUND INFORMATION

A vehicle can have a driving dynamics controller, which is able to prevent skidding of the vehicle through braking interventions at individual wheels. The braking interventions are able to be triggered when an initial breakaway of the vehicle is detected with the use of sensors, in particular inertial sensors.

SUMMARY

In accordance with the present invention, an example method for influencing the driving dynamics of a vehicle and a driving dynamics controller; finally, it also provides a corresponding computer program product and a machine-readable memory medium are provided. Advantageous further developments of and improvements in the approach described herein result from the description herein and the FIGURE.

Specific embodiments of the present invention may advantageously make it possible to adapt the driving characteristics of a vehicle to a changing wheel grip as a result of changing road conditions. Before the wheel grip is lost, driving dynamics of the vehicle are restricted. This makes it possible to prevent a loss of control, in particular by an inexperienced driver.

A method is provided for influencing the driving dynamics of a vehicle in which the driving dynamics are influenced as a function of parameters allocated to a selected driving dynamics mode when the driving dynamics mode is activated, and in which the driving dynamics are influenced as a function of road state information representing a road state in the region of the vehicle when an automatic mode is activated.

Improvements and enhancement to the specific embodiments of the present invention described herein are possible.

In accordance with the present invention, the driving dynamics of a vehicle are able to be influenced in that torques at individual wheels of the vehicle are influenced in order to generate a correcting yawing moment that is directed counter to a yawing moment resulting from inertial forces, for instance. A wheel, for example, is able to be decelerated in the process. Alternatively or additionally, a drive torque may be reduced at a driven wheel. It is also possible to increase the drive torque at the driven wheel in an effort to generate the corrective yawing moment.

The driving dynamics of the vehicle may be influenced in accordance with a plurality of different driving dynamics modes. Here, the driving dynamics modes differ with regard to certain parameters on the basis of which, for example, a decision is able to be made as to whether an active intervention in the driving dynamics of the vehicle is to take place through an automated control of brakes and/or a drive torque at the wheel or a plurality of wheels.

Parameters of a driving dynamics mode for dry roads may be specified in such a way that a stability limit will typically not be reached or exceeded on a dry road. The stability limit begins at the point where a maximally transmittable friction force between the wheel and road is exceeded and the wheel loses traction. Parameters of a driving dynamics mode for a wet road may be specified in such a way that the stability limit is typically not reached or exceeded on a wet road. Parameters of an advanced mode, for example, may allow for selective drifts in which the stability limit is exceeded in a controlled manner. Fixed values for the maximally transmittable friction force may be stored in the driving dynamics modes.

The different driving dynamics modes are able to be selected and/or set by a driver of the vehicle. For this purpose, the driver may select his or her desired driving dynamics mode via a man-machine interface such as a selector switch. When a certain driving dynamics mode is selected, the parameters that apply to these particular driving dynamics mode are fixedly set.

In the automatic mode, the parameters are dependent upon the maximally transmittable friction force between the wheels and a surface. While the automatic mode is set, the currently valid parameters are therefore set to be automatically variable. In other words, in the automatic mode no fixed parameters are utilized for the decision about an intervention in the driving dynamics; instead, monitoring is carried out on a continuous basis or at certain intervals in order to ascertain how high the maximally transmittable friction force is between the wheels and a surface, and the parameters are then set according to the situation.

The maximally transmittable friction force is dependent on a state of the surface, among other things. The state of the surface may depend on a material of the surface, a nature of the material and weather-related influences.

Ideally, the maximally transmittable friction force is the same in all directions. A vector product of an acceleration force or brake force at the wheel and a lateral guidance force at the wheel may at most be as large as the maximally transmittable friction force at the wheel. If this ratio is exceeded, the wheel loses traction at the stability limit and the vehicle may break away or oversteer or understeer.

Road state information may include information about the material of the surface, the nature of the material and a weather-related state of the surface. For example, the information about the material may reflect whether the surface is unpaved, paved, cobbled or made of poured concrete. The nature of the material, for example, may describe whether the material is smooth, rough, firm or loose. The weather-related state may represent whether the surface is dry, moist or wet. In the same way, the weather-related state may represent ice or slushy snow. Leaves or loose chippings may be represented via the material or the nature of the material, for instance.

To influence the driving dynamics, control signals are able to be supplied for a brake system of the vehicle and/or a drive control of the vehicle. Alternatively or additionally, parameters of the brake system and/or the drive control are able to be set. A response behavior of the drive control and/or intervention thresholds of a driving dynamics control of the brake system is/are able to be set as a function of the road state.

The driving dynamics mode may be deactivated during a start of the vehicle and the automatic mode be activated. An automatic activation of the automatic mode makes it impossible for a driver to unintentionally reach the stability limit. To allow driving at the stability limit even when the road state is difficult, the driver must manually activate the corresponding driving dynamics mode.

The driving dynamics are able to be restricted if contradictory or no road state information is available. Poor road conditions may then be assumed for reasons of safety. When meaningful road state information is available once more, the restrictions are able to be canceled again.

The road state information is able to be read in from a road state detection device of the vehicle. For example, a road state detection device may infer the road state with the aid of camera images, radar echoes, lidar echoes, ultrasound echoes and/or environmental noise, for example. The road state is able to be determined with an uncertainty factor. The uncertainty factor may be included in the road state information. The environmental noise may particularly be used above a speed threshold.

The road state information is able to be read in via a communications device of the vehicle. The communications device may be used below the speed threshold, in particular. A weather report, which may include current measured values, is able to be read in via the communications device. The road state information may also be supplied by other road users.

The road state information is able to be read in by a navigation system of the vehicle and/or a rain detection system of the vehicle. When precipitation is present, a GPS signal may have interference. The interference level may be used to infer a precipitation intensity. Precipitation may also be detected directly via a rain sensor of the vehicle.

The present method, for example, may be implemented in software or hardware or in a mixed form of software and hardware, e.g., in a control unit.

In addition, a driving dynamics controller for influencing the driving dynamics of a vehicle is introduced, which is developed to carry out, actuate or implement the steps of a variant of the method introduced here in corresponding devices.

The driving dynamics controller may be an electrical device having at least one processing unit for processing signals or data, at least one memory unit for storing signals or data, and at least one interface and/or a communications interface for reading in or outputting data which are embedded in a communications protocol. The processing unit, for example, may be a signal processor, what is known as a system ASIC, or a microcontroller for processing sensor signals and outputting data signals as a function of the sensor signals. For instance, the memory unit may be a flash memory, an EPROM or a magnetic memory unit. The interface is able to be developed as a sensor interface for reading in the sensor signals from a sensor, and/or as an actuator interface for outputting the data signals and/or control signals to an actuator. The communications interface may be developed to read in or output the data in a wireless and/or line-conducted manner. The interfaces can also be software modules which are provided on a microcontroller in addition to other software modules, for example.

Also advantageous is a computer program product or a computer program including program code, which may be stored on a machine-readable carrier or memory medium such as a semiconductor memory, a hard disk memory, or an optical memory, and which is used for carrying out, implementing and/or actuating the steps of the method as described in one of the afore-described specific embodiments, in particular when the program product or program is executed on a computer or a device such as a programmable driving dynamics controller, for example.

It is pointed out that some of the possible features and advantages of the present invention are described here with reference to different specific embodiments. One skilled in the art will realize that the features of the driving dynamics controller and the present method are able to be suitably combined, adapted or exchanged in order to arrive at further specific embodiments of the present invention.

BRIEF DESCRIPTION OF THE DRAWINGS

Below, specific example embodiments of the present invention are described with reference to the FIGURE, but neither the drawing nor the description is to be interpreted as restricting the present invention.

FIG. 1 shows a representation of a vehicle having a driving dynamics controller according to an exemplary embodiment.

The FIGURE is merely schematic and not true to scale.

DETAILED DESCRIPTION OF EXAMPLE EMBODIMENTS

FIG. 1 shows a representation of a vehicle 100 having a driving dynamics controller 102 according to an exemplary embodiment. Driving dynamics controller 102 reads in an item of road state information 104. Road state information 104 represents a road state in the area of vehicle 100. Using road state information 104, driving dynamics controller 102 influences a driving dynamics of vehicle 100 as a function of the road state when an automatic mode of driving dynamics controller 102 is activated.

In order to influence the driving dynamics, a drive control unit 106 and a brake control unit 108 are actuated. Drive parameters are adapted to the road state in drive control unit 106, and brake parameters are adapted to the road state in brake control unit 108. Via drive control device 106, for example, a response behavior of a drive 110 of vehicle 100 is adjustable to a driving pedal operation. An intervention threshold for stabilizing brake interventions at individual wheels is able to be adjusted via brake control unit 108, for example.

In one exemplary embodiment, road state information 104 is supplied by a road state detection device 112. Road state detection device 112 evaluates sensor signals from sensors of vehicle 100, for instance, with the goal of detecting the road state. For example, a wet road is detectable by a characteristic driving noise of vehicle 100.

In one exemplary embodiment, road state information 104 is read in by an information service. The information service, for example, is able to use data from a weather radar and/or data from a measuring network of weather sensors in order to supply road state information for an environment of vehicle 100.

In one exemplary embodiment, the automatic mode is activated via a control element 114 of vehicle 100. For instance, the control element may be a rotary control switch on a steering wheel of vehicle 100. In addition to the automatic mode, further driving dynamics modes are selectable via a control element 114. For instance, a mode for wet roads is able to be selected. When the mode for wet roads is selected, the response behavior of drive 110 and the intervention thresholds for the stabilizing braking interventions are adjusted to the expected reduced friction force of the wheels of vehicle 100. Vehicle 100 is thereby able to be driven in a safe manner even when the roads are slippery.

For instance, a driving dynamics mode for experts is selectable as well on control element 114. The response behavior of drive 110 and the intervention thresholds for the stabilizing braking interventions are then adjusted in such a way that vehicle 100 is able to drift around curves, for example.

In one exemplary embodiment, the automatic mode is activated during the start of vehicle 100, regardless of which driving dynamics mode was selected previously. For this purpose, the driving dynamics modes are able to be adjusted via a menu of control element 114, for example. In the case of a mechanical control element 114, the automatic mode may be located at an initial setting of control element 114. Control element 114 may be moved back to the initial setting by a spring force in a voltage-free state, i.e. when the vehicle is switched off. Mechanical control element 114 is also able to be moved with the aid of a motor.

Below, a variant of the method described herein will be explained in other words with the aid of a specific embodiment. Introduced specifically is an automated, so-called wet mode through a calculation of the road state using ultrasonic sensors.

In some sports cars, the friction value is selectable via a switch. For example, it is possible to manually select a so-called wet mode for wet roads using a switch.

In the case of roads that are drying, it is often the case that individual sections, in particular curves, are still wet or moist while other road sections are already completely dry. Since the wet mode has a considerable influence on the vehicle behavior, it would be advantageous in such a situation if the driver would operate the switch continuously according to the requirements while driving. However, the continuous switching may be beyond the driver's capabilities, which is why the driver rather accepts a less than optimal vehicle behavior so that he may better concentrate on controlling the vehicle.

In the approach introduced here, the activation and deactivation of the wet mode is able to be automated.

Toward this end, the switch for a selection of dry or moist has an "auto" setting, for instance. When the "auto" switch setting is selected, the vehicle automatically selects the correct setting for the driving dynamics (dry or moist) as a function of a moisture detection with the aid of an ultrasonic sensor system, for example.

In one exemplary embodiment of the approach presented here, the mode 'dry" is reset to "auto" after each deactivation of the vehicle. In this way, an unintentional or even worse, an unnoticed, selection of the "dry" mode will not lead the driver to control the vehicle less satisfactorily in limit situations. For example, this is advantageous in the case of a rental car when the last rental car driver has set the switch to "dry" and the next rental car driver, being unable to familiarize himself adequately with the multitude of vehicle settings, would then learn to drive the vehicle in the "dry" mode although the road is wet.

If the road state is unable to be determined for a brief period of time, e.g., due to environmental noise, or for a longer period on account of a defect, then it will be assumed that the environment is wet. The vehicle thus behaves in a more manageable manner both with a wet and a dry road.

Because of the automatic switchover, for example, shorter lap times are achievable when driving on a race course. In addition, accidents on public roads are reduced. As an alternative to the switch, configuration options for switching between the modes may be provided via the display.

In conclusion, it should be pointed out that terms like "having", "including" etc. do not exclude other elements or steps, and terms such as "a" do not exclude a multitude.

What is claimed is:

1. A method for influencing driving dynamics of a vehicle, the method comprising:
   influencing, via a driving dynamics controller, the driving dynamics of the vehicle as a function of parameters allocated to a selected driving dynamics mode when a driving dynamics mode is activated, wherein the driving dynamics controller reads in an item of road state information; and
   influencing the driving dynamics as a function of the road state information representing a road state in a region of the vehicle when an automatic mode is activated, wherein a drive control unit and a brake control unit are actuated to influence the driving dynamics;
   wherein the road state information is supplied by a road state detection device, which evaluates sensor signals from sensors of the vehicle to detect the road state, and/or by an information service which supplies the road state information for an environment of the vehicle, and
   wherein the parameters include brake parameters and drive parameters, the drive parameters being adapted to the road state in the drive control unit, and wherein the brake parameters are adapted to the road state in the brake control unit,
   wherein the automatic mode or further driving dynamics modes are activated via a control element of the vehicle, and
   wherein, the automatic mode is activated during a start of the vehicle, regardless of which driving dynamics mode was selected before the activation of the automatic mode, and wherein the driving dynamics modes are adjustable via a menu of the control element.

2. The method as recited in claim 1, further comprising:
   deactivating the driving dynamics mode during a start of the vehicle and activating the automatic mode during the start of the vehicle.

3. The method as recited in claim 1, further comprising:
   restricting the driving dynamics when contradictory or no road state information is available.

4. The method as recited in claim 1, further comprising:
   reading-in the road state information, from the information service, via a communications device of the vehicle.

5. The method as recited in claim 1, further comprising:
   reading-in the road state information by a navigation system of the vehicle and/or a rain detection system of the vehicle.

6. A driving dynamics controller apparatus for influencing driving dynamics of a vehicle, comprising:
   a driving dynamics controller configured to perform the following:
      influencing, via a driving dynamics controller, the driving dynamics of the vehicle as a function of parameters allocated to a selected driving dynamics mode when a driving dynamics mode is activated, wherein the driving dynamics controller reads in an item of road state information; and
      influencing the driving dynamics as a function of the road state information representing a road state in a region of the vehicle when an automatic mode is activated, wherein a drive control unit and a brake control unit are actuated to influence the driving dynamics;

wherein the road state information is supplied by a road state detection device, which evaluates sensor signals from sensors of the vehicle to detect the road state, and/or by an information service which supplies the road state information for an environment of the vehicle, and wherein the parameters include brake parameters and drive parameters, the drive parameters being adapted to the road state in the drive control unit, and wherein the brake parameters are adapted to the road state in the brake control unit, wherein the automatic mode or further driving dynamics modes are activated via a control element of the vehicle, and wherein, the automatic mode is activated during a start of the vehicle, regardless of which driving dynamics mode was selected before the activation of the automatic mode, and wherein the driving dynamics modes are adjustable via a menu of the control element.

7. The apparatus of claim 6, wherein the control element includes a rotary control switch on a steering wheel or a menu of the vehicle.

8. The apparatus of claim 6, wherein a mode for wet roads is selectable, and wherein when the mode for wet roads is selected, a response behavior of drive and intervention thresholds for stabilizing braking interventions are adjusted to an expected reduced friction force of wheels of the vehicle.

9. The apparatus of claim 6, wherein a driving dynamics mode for experts is selectable, and wherein a response behavior of drive and the intervention thresholds for stabilizing braking interventions are adjusted so that the vehicle is driftable around curves.

10. The apparatus of claim 6, wherein for a mechanical control element, the automatic mode is located at an initial setting of the control element.

11. A driving dynamics controller apparatus for influencing driving dynamics of a vehicle, comprising:
 a driving dynamics controller configured to perform the following:
  influencing, via a driving dynamics controller, the driving dynamics of the vehicle as a function of parameters allocated to a selected driving dynamics mode when a driving dynamics mode is activated, wherein the driving dynamics controller reads in an item of road state information; and
  influencing the driving dynamics as a function of the road state information representing a road state in a region of the vehicle when an automatic mode is activated, wherein a drive control unit and a brake control unit are actuated to influence the driving dynamics;
 wherein the road state information is supplied by a road state detection device, which evaluates sensor signals from sensors of the vehicle to detect the road state, and/or by an information service which supplies the road state information for an environment of the vehicle, and
 wherein the parameters include brake parameters and drive parameters, the drive parameters being adapted to the road state in the drive control unit, and wherein the brake parameters are adapted to the road state in the brake control unit,
 wherein the automatic mode or further driving dynamics modes are activated via a control element of the vehicle, and
 wherein activation and deactivation of a wet mode is automated, wherein a switch for a selection of a dry mode or a wet mode has an "auto" setting, so that when the "auto" switch setting is selected, the vehicle automatically selects the correct setting for the driving dynamics of the dry mode or the wet mode as a function of a detection of a wet condition.

12. The apparatus of claim 11, wherein the mode of dry is reset to auto after each deactivation of the vehicle, so that an unintentional or unnoticed selection of the dry mode will not lead the driver to control the vehicle less satisfactorily in limit situations.

13. The apparatus of claim 11, wherein when the road state is unable to be determined for a period of time, due to noise, or for another time period, due to a defect, then it is assumed that the environment is wet, so that the vehicle behaves both for a wet road and a dry road, and wherein the another time period exceeds the period of time.

14. A non-transitory machine-readable memory medium, having a computer program, which is executable by a processor, comprising:
 a program code arrangement having program code for influencing driving dynamics of a vehicle, by performing the following:
  influencing, via a driving dynamics controller, the driving dynamics of the vehicle as a function of parameters allocated to a selected driving dynamics mode when a driving dynamics mode is activated, wherein the driving dynamics controller reads in an item of road state information; and
  influencing the driving dynamics as a function of the road state information representing a road state in a region of the vehicle when an automatic mode is activated, wherein a drive control unit and a brake control unit are actuated to influence the driving dynamics;
 wherein the road state information is supplied by a road state detection device, which evaluates sensor signals from sensors of the vehicle to detect the road state, and/or by an information service which supplies the road state information for an environment of the vehicle, and
 wherein the parameters include brake parameters and drive parameters, the drive parameters being adapted to the road state in the drive control unit, and wherein the brake parameters are adapted to the road state in the brake control unit,
 wherein the automatic mode or further driving dynamics modes are activated via a control element of the vehicle, and
 wherein, the automatic mode is activated during a start of the vehicle, regardless of which driving dynamics mode was selected before the activation of the automatic mode, and wherein the driving dynamics modes are adjustable via a menu of the control element.

* * * * *